US012694821B2

(12) United States Patent
Cheng et al.

(10) Patent No.: US 12,694,821 B2
(45) Date of Patent: Jul. 28, 2026

(54) DISPLAY DEVICE INCLUDING THERMISTOR

(71) Applicant: AUO Corporation, Hsinchu City (TW)

(72) Inventors: Ching-Yang Cheng, Hsinchu City (TW); Ming-Hung Chuang, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 0 days.

(21) Appl. No.: 18/946,867

(22) Filed: Nov. 13, 2024

(65) Prior Publication Data

US 2026/0057822 A1 Feb. 26, 2026

(30) Foreign Application Priority Data

Aug. 23, 2024 (TW) ................................ 113131821

(51) Int. Cl.
*G09G 3/32* (2016.01)

(52) U.S. Cl.
CPC ....... *G09G 3/32* (2013.01); *G09G 2320/0285* (2013.01); *G09G 2320/041* (2013.01); *G09G 2330/028* (2013.01); *G09G 2330/045* (2013.01)

(58) Field of Classification Search
CPC ...... G09G 3/32–3291; G09G 2300/0421–043; G09G 2310/0243; G09G 2310/0289; G09G 2310/06; G09G 2310/066; G09G 2310/08; G09G 2320/0233; G09G 2320/0242; G09G 2320/0266; G09G 2320/0285; G09G 2320/04; G09G 2320/041; G09G 2330/028–045
See application file for complete search history.

(56) References Cited

U.S. PATENT DOCUMENTS 6,803,899 B1 * 10/2004 Masazumi ........... G09G 3/3629 345/103
2010/0014028 A1 * 1/2010 Yamato ................ G09G 3/3648 349/72
2015/0219503 A1 8/2015 Yoshida
(Continued)

FOREIGN PATENT DOCUMENTS

CN 113724658 11/2021
CN 115101018 9/2022
WO WO-2022019512 A1 * 1/2022 ............... G09G 3/32

OTHER PUBLICATIONS

English translation of WO-2022019512-A1 (Year: 2022).*

*Primary Examiner* — Nathan Danielsen
(74) *Attorney, Agent, or Firm* — JCIPRNET

(57) ABSTRACT

Disclosed is a display device. The display device includes multiple driving transistors, a sensing circuit and a controlling circuit. The controlling circuit is coupled to the driving transistors and the sensing circuit arranged on a substrate. The driving circuits drives multiple light-emitting elements. The sensing circuits includes a thermistor. The sensing circuit generates a sensing voltage according to an input voltage. The controlling circuit generates an offset voltage according to the sensing voltage, based on multiple reference tables regarding resistance, temperature and threshold voltage of each of the driving transistors, and drives the driving transistors according to the offset voltage. Thereby, abnormalities of a display screen caused by temperature change May be avoided.

7 Claims, 4 Drawing Sheets

(56) References Cited

U.S. PATENT DOCUMENTS

| | | | | |
|---|---|---|---|---|
| 2018/0090103 | A1* | 3/2018 | Zhang .................. | G09G 3/2003 |
| 2018/0122872 | A1* | 5/2018 | Kim ..................... | G09G 3/3233 |
| 2018/0366061 | A1* | 12/2018 | Furukawa ................ | G09G 3/20 |

* cited by examiner

DISPLAY DEVICE INCLUDING THERMISTOR

CROSS-REFERENCE TO RELATED APPLICATION

This application claims the priority benefit of Taiwan application serial no. 113131821, filed on Aug. 23, 2024. The entirety of the above-mentioned patent application is hereby incorporated by reference herein and made a part of this specification.

BACKGROUND

Technical Field

The present disclosure relates to an electronic device, and more particularly to a display device.

Description of Related Art

Generally, in a display device, a light-emitting diode (LED) emits light when driven by a driving transistor. However, when the light-emitting diode emits light, the temperature of the display device correspondingly increases, causing the temperature of the driving transistor to rise. Consequently, the elevated temperature affects the operation of the driving transistor in driving the light-emitting diode, thereby influencing the grayscale values of the display device, which may result in abnormalities of display screen.

SUMMARY

An embodiment of the present disclosure provides a display device capable of compensating for driving transistors in response to the current temperature of the display device, thereby preventing abnormalities of the display screen.

An embodiment of the present disclosure discloses a display device including multiple driving transistors, at least one sensing circuit, and a controlling circuit. The multiple driving transistors are disposed on a substrate. The multiple driving transistors are configured to drive multiple light-emitting elements. The sensing circuit includes a thermistor. The sensing circuit is disposed on the substrate. The sensing circuit is configured to generate a sensing voltage based on an input voltage. The controlling circuit is coupled to the multiple driving transistors and the sensing circuit. The controlling circuit is configured to generate an offset voltage according to the sensing voltage, based on multiple reference tables associated with resistance, temperature, and threshold voltage of each of the driving transistors, and to drive the multiple driving transistors based on the offset voltage.

Based on the foregoing, the display device in the embodiment of the present disclosure, utilizing predetermined multiple reference tables and a thermistor disposed on the substrate, is capable of ascertaining the resistance, temperature, and the threshold voltage of the driving transistor corresponding to the sensing voltage. Consequently, the display device is able to generate an offset voltage in response to the current temperature of the display device, thereby compensating for variations in the driving transistor caused by temperature fluctuations, thus preventing anomalies of the display screen.

In order to make the above-mentioned features and advantages of the present disclosure more obvious and easy to understand, embodiments are given below and described in detail with reference to the attached drawings.

DESCRIPTION OF THE EMBODIMENTS

Figure 1:
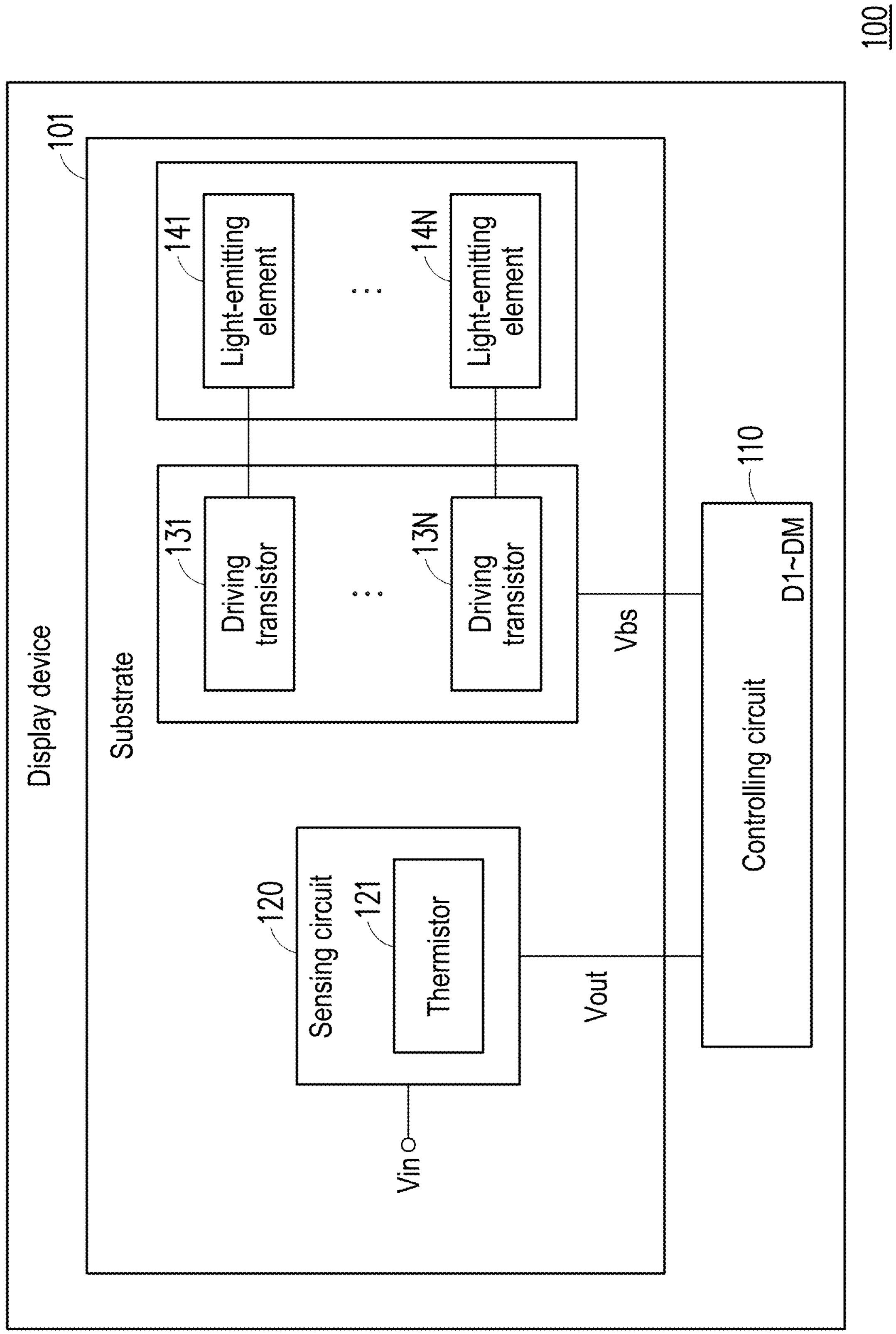
FIG. 1 is a block diagram of a display device according to an embodiment of the present disclosure.

Certain embodiments of the present disclosure will now be described in detail with reference to the accompanying drawings. In the following description, when identical reference numerals appear in different drawings, they shall be construed as denoting identical or similar components. These embodiments represent only a portion of the disclosure and do not disclose all possible implementations of the present disclosure. More precisely, these embodiments serve as exemplary illustrations within the scope of the claims of the present disclosure.

FIG. 1 illustrates a block diagram of a display device according to an embodiment of the present disclosure. Referring to FIG. 1, the display device 100 includes a controlling circuit 110, a sensing circuit 120, multiple driving transistors 131 to 13N, and multiple light-emitting elements 141 to 14N, wherein N is a positive integer greater than 1. The sensing circuit 120, multiple driving transistors 131 to 13N, and multiple light-emitting elements 141 to 14N are all disposed on a substrate 101 of the display device 100. The substrate 101 is, for example, a glass substrate. The controlling circuit 110 is coupled to the sensing circuit 120 and multiple driving transistors 131 to 13N.

In this embodiment, multiple driving transistors 131 to 13N and multiple light-emitting elements 141 to 14N are disposed within the active area (not shown) of the substrate 101. The multiple driving transistors 131 to 13N are respectively employed to drive the multiple light-emitting elements 141 to 14N, thereby causing the light-emitting elements 141 to 14N to emit light.

Specifically, each of the driving transistors (for example, driving transistor 131) is controlled by a control signal (for example, offset voltage Vbs) from the controlling circuit 110, and drives the corresponding light-emitting element (for example, light-emitting element 141) according to the control signal. The driving transistor 131 and its corresponding light-emitting element 141 may constitute a single pixel unit (for example, the pixel unit 350 shown in FIG. 4). In other words, the driving transistors 131 to 13N and the light-emitting elements 141 to 14N form multiple pixel units. The pixel units are arranged in an array on the substrate 101.

In the present embodiment, each of the driving transistors 131 to 13N is implemented, for example, as a p-type Metal-Oxide-Semiconductor Field-Effect Transistor (PMOSFET) or an n-type Metal-Oxide-Semiconductor Field-Effect Transistor (NMOSFET). Each of the light-emitting elements 141 to 14N is implemented, for example, as a Light-Emitting Diode (LED).

In this embodiment, the sensing circuit 120 is disposed within the active area of the substrate 101. The first terminal of the sensing circuit 120 receives an input voltage Vin. The input voltage Vin is, for example, a high power supply voltage. The second terminal of the sensing circuit 120 is coupled to the controlling circuit 110.

Furthermore, the sensing circuit 120 includes a thermistor 121. Based on the operation of the thermistor 121, the sensing circuit 120 is configured to generate a sensing voltage Vout in accordance with the input voltage Vin, and to output the sensing voltage Vout to the controlling circuit 110. The sensing voltage Vout indicates the temperature variation detected by the thermistor 121 on the substrate 101.

In the present embodiment, the controlling circuit 110 is, for example, a signal converter, a Field Programmable Gate Array (FPGA), a Central Processing Unit (CPU), or other programmable general-purpose or special-purpose microprocessors, Digital Signal Processors (DSP), programmable controllers, Application Specific Integrated Circuits (ASIC), Programmable Logic Devices (PLD), or other similar devices or combinations thereof, capable of loading and executing computer program-related firmware or software to implement functions such as access, computation, and control.

In detail, the controlling circuit 110 is configured to access multiple predetermined reference tables D1 to DM, wherein M is a positive integer greater than 1. These reference tables D1 to DM correlate to resistance, temperature, and threshold voltage values for each of the driving transistors 131 to 13N, and indicate the corresponding relationships among the aforementioned multiple parameters.

In the present embodiment, the controlling circuit 110 is configured to receive the sensing voltage Vout. The controlling circuit 110 is further configured to generate an offset voltage Vbs according to the sensing voltage Vout, based on multiple reference tables D1 to DM, and to drive multiple driving transistors 131 to 13N according to the offset voltage Vbs. The offset voltage Vbs is, for example, utilized to control signals in independent circuits for each of the driving transistors 131 to 13N, and is, for instance, a gate control signal. In other words, each of the driving transistors 131 to 13N receives its respective independent offset voltage Vbs.

It is noteworthy that, as the sensing voltage Vout indicates the temperature change detected by the thermistor 121, the controlling circuit 110 is capable of determining the resistance, temperature, and threshold voltage corresponding to the sensing voltage Vout based on multiple reference tables D1 to DM. Consequently, the controlling circuit 110 may further adjust the control signals (i.e., offset voltage Vbs) of multiple driving transistors 131 to 13N according to the aforementioned multiple parameters (including the threshold voltage corresponding to temperature changes). As a result, the display device 100 may compensate for the variations in multiple driving transistors 131 to 13N caused by temperature in response to its current temperature, and drive the driving transistors 131 to 13N with the compensated offset voltage Vbs, thereby preventing anomalies of the display screen of the display device 100.

Figure 2:
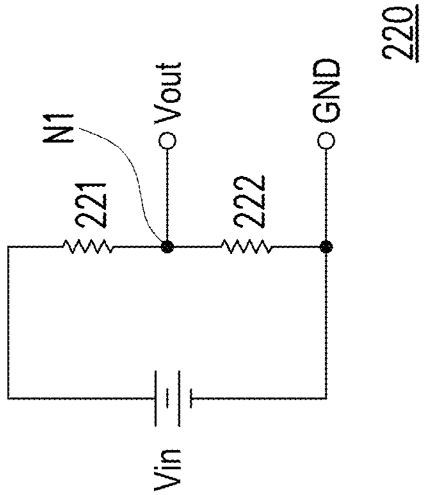
FIG. 2 is a circuit diagram of a sensing circuit according to an embodiment of the present disclosure.

FIG. 2 is a circuit diagram of a sensing circuit according to an embodiment of the present disclosure Referring to FIG. 2, the sensing circuit 220 may be implemented in the display device 100 shown in FIG. 1. The sensing circuit 220 exemplifies an embodiment of the sensing circuit 120 depicted in FIG. 1.

In an embodiment illustrated in FIG. 2, the sensing circuit 220 is implemented, for example, as a voltage divider circuit. The sensing circuit 220 includes a thermistor 221 and a second resistor 222. The thermistor 221 and the second resistor 222 are connected in series between the input voltage Vin and the reference voltage GND.

In more detail, the first terminal of the thermistor 221 receives an input voltage Vin. The second terminal of the thermistor 221 is coupled with the first terminal of the second resistor 222 at a voltage divider node N1. The second terminal of the second resistor 222 receives a reference voltage GND. The reference voltage GND is, for example, a ground voltage.

In the present embodiment, when the temperature of the substrate (for example, the substrate 101 shown in FIG. 1) changes (for instance, increases), the resistance value of the thermistor 221 correspondingly changes. Consequently, the sensing circuit 220 is capable of outputting the sensing voltage Vout at the voltage divider node N1 through the design of a voltage divider circuit, thereby indicating the temperature change detected by the thermistor 221, and thus indicating the current temperature change of the display device.

In the present embodiment, the dimension of the thermistor 221 is, for example, less than 1 millimeter (mm). In the embodiment, the thermistor 221 is, for instance, disposed on the substrate by means of bonding.

In the present embodiment, the material of the second resistor 222 includes polysilicon material. For example, the material of the second resistor 222 may be polysilicon materials such as indium gallium zinc oxide (IGZO), titanium (Ti) and aluminum (Al) compound, and molybdenum (Mo) and aluminum compound. The material of the second resistor 222 may also be a high-resistance transparent metal material. The second resistor 222 possesses a high resistance value (e.g., 10 kΩ).

Figure 3:
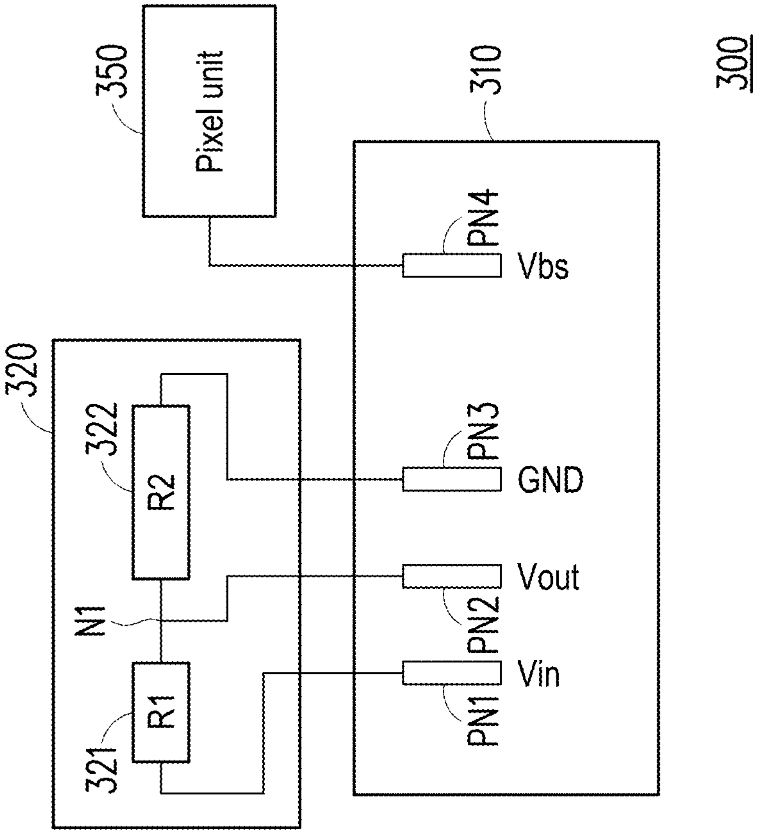
FIG. 3 is a circuit diagram of a display device according to another embodiment of the present disclosure.

FIG. 3 is a circuit diagram of a display device according to another embodiment of the present disclosure. Referring to FIG. 3, the display device 300 includes a controlling circuit 310, at least one sensing circuit 320, and multiple pixel units, wherein FIG. 3 schematically depicts a single pixel unit 350. Each pixel unit possesses an identical circuit architecture. The various circuit components within each pixel unit have corresponding identical specifications.

Figure 4:
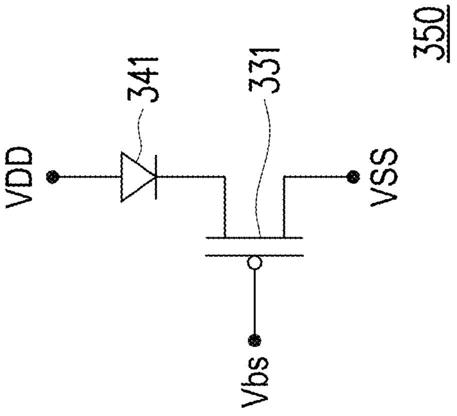
FIG. 4 is a circuit diagram of a pixel unit according to the embodiment of FIG. 3 of the present disclosure.

Referring concurrently to FIG. 4, which illustrates a circuit diagram of a pixel unit in accordance with the embodiment of FIG. 3 of the present disclosure. In the embodiment depicted in FIG. 4, the pixel unit 350 includes a driving transistor 331 and a light-emitting element 341. The controlling circuit 310, sensing circuit 320, driving transistor 331, and light-emitting element 341 may be understood by analogy with reference to the pertinent descriptions of the display device 100.

In the embodiment of FIG. 3, the sensing circuit 320 includes a thermistor 321 (i.e., resistor R1) and a second resistor 322 (i.e., resistor R2). The thermistor 321 and the second resistor 322 may be understood by analogy with reference to the description of the sensing circuit 220.

In the embodiment of FIG. 4, the driving transistor 331 is implemented, for example, as a PMOSFET. The light-emitting element 341 is implemented, for instance, as a micro light-emitting diode (Micro LED).

Specifically, the control terminal (i.e., the gate terminal) of the driving transistor 331 receives the offset voltage Vbs. The first terminal (i.e., the first source/drain terminal) of the driving transistor 331 is coupled to the cathode terminal of the light-emitting element 341. The second terminal (i.e., the second source/drain terminal) of the driving transistor 331 receives the reference voltage VSS. The anode terminal of the light-emitting element 341 receives the reference voltage VDD. The reference voltage VSS is, for example, a low power supply voltage. The reference voltage VDD is, for example, a high power supply voltage.

In the present embodiment, the controlling circuit 310 is implemented, for example, as an integrated circuit or a microcontroller unit (MCU). The controlling circuit 310 includes multiple pins PN1 to PN4. The controlling circuit 310 is coupled to the first terminal of the thermistor 321 through the pin PN1 to provide the input voltage Vin. The controlling circuit 310 is coupled to the voltage divider node N1 of the sensing circuit 320 through the pin PN2 to receive the sensing voltage Vout. The controlling circuit 310 is coupled to the second terminal of the second resistor 322 through the pin PN3 to provide a reference voltage GND. The controlling circuit 310 is coupled to the pixel unit 350 through the pin PN4 to provide the offset voltage Vbs.

In detail, in response to temperature variations of the display device 300, the sensing circuit 320 generates the sensing voltage Vout based on the input voltage Vin, enabling the controlling circuit 310 to receive the sensing voltage Vout through the pin PN2. Furthermore, the controlling circuit 310 calculates the sensing voltage Vout based on the input voltage Vin and the voltage division information corresponding to the thermistor 321, in order to obtain the sensing resistance value of the thermistor 321. The voltage division information indicates the voltage division state between the thermistor 321 and the second resistor 322, which is to say, the resistance value ratio based on the voltage divider rule.

In the present embodiment, the calculation method for the sensing voltage Vout may be expressed, for example, by the following formula (1). In formula (1), Vout represents the voltage value of the sensing voltage Vout, Vin represents the voltage value of the input voltage Vin, R1 represents the resistance value of the thermistor 321, and R2 represents the resistance value of the second resistor 322.

$$Vout = \frac{Vin \times R2}{R1 + R2} \quad \text{Formula (1)}$$

Whereas the second resistor 322 possesses a fixed high resistance value, and the input voltage Vin maintains a constant voltage value, the controlling circuit 310 calculates the sensing voltage Vout based on the voltage division information (specifically, the resistance ratio between R1 and R2) as indicated by formula (1), in order to obtain the sensing resistance value (i.e., R1) of the thermistor 321. The sensing resistance value of the thermistor 321 indicates the resistance value exhibited by the thermistor 321 in response to the current temperature variation.

Subsequently, the controlling circuit 310 obtains the sensed temperature by referencing the first reference table among multiple reference tables (for example, the reference table D1 shown in FIG. 1) based on the sensing resistance value. In this embodiment, the first reference table includes the corresponding relationship between the resistance value of the thermistor 321 and the temperature. The first reference table may also be referred to as the resistance-temperature table (i.e., RT table).

In other words, due to a temperature change (for example, an increase) in the display device 300, the resistance value of the thermistor 321 correspondingly changes. The controlling circuit 310 accesses the sensing voltage Vout at the voltage divider node N1 and converts the sensing voltage Vout into a corresponding sensing resistance value. The controlling circuit 310, utilizing a look-up table pertaining to the thermistor 321 (i.e., the first reference table), is capable of determining the current temperature (i.e., the sensed temperature) at the position of the thermistor 321 based on the sensing resistance value.

In the present embodiment, the controlling circuit 310 calculates the sensed temperature based on a second reference table among multiple reference tables (for example, another reference table DN as shown in FIG. 1) to obtain the offset voltage difference for each threshold voltage. In this embodiment, the second reference table includes the corresponding relationship between temperature and each threshold voltage. The aforementioned threshold voltage includes the threshold voltage of the driving transistor 331. The second reference table may also be referred to as an experimental data table of temperature and threshold voltage of the driving transistor.

It should be noted that, as the threshold voltage of each driving transistor (exemplified by driving transistor 331) varies with temperature, the controlling circuit 310 utilizes a second reference table to predetermine multiple threshold voltages of the driving transistor 331 under different temperature conditions.

In other words, the controlling circuit 310 performs interpolation calculations on the sensed temperature according to the second reference table to obtain the threshold voltage corresponding to the sensed temperature. The controlling circuit 310 calculates the difference between the aforementioned threshold voltage and the preset threshold voltage of the driving transistor 331 to obtain the variation (i.e., offset voltage difference) of the threshold voltage of the driving transistor 331. The preset threshold voltage is, for example, the threshold voltage indicated in the specifications of the driving transistor 331, or the current threshold voltage of the driving transistor 331 prior to the temperature change.

Subsequently, the controlling circuit 310 generates the offset voltage Vbs based on the offset voltage difference. For instance, the controlling circuit 310 shifts the current voltage used to drive the driving transistor 331 by a single offset voltage difference to obtain the offset voltage Vbs. In other words, the offset voltage Vbs serves as a control signal that compensates for temperature variations.

In the present embodiment, the controlling circuit 310 outputs the offset voltage Vbs through the pin PN4 to each of the driving transistors (including driving transistor 331). The driving transistor 331, based on the offset voltage Vbs, drives the light-emitting element 341 to emit light with reference to the reference voltage VDD. Consequently, even if the driving transistor 331 experiences variations in its threshold voltage due to temperature increases, the driving transistor 331 is capable of operating according to the temperature-compensated offset voltage Vbs, thereby maintaining the grayscale value corresponding to the light-emitting element 341.

Figure 5:
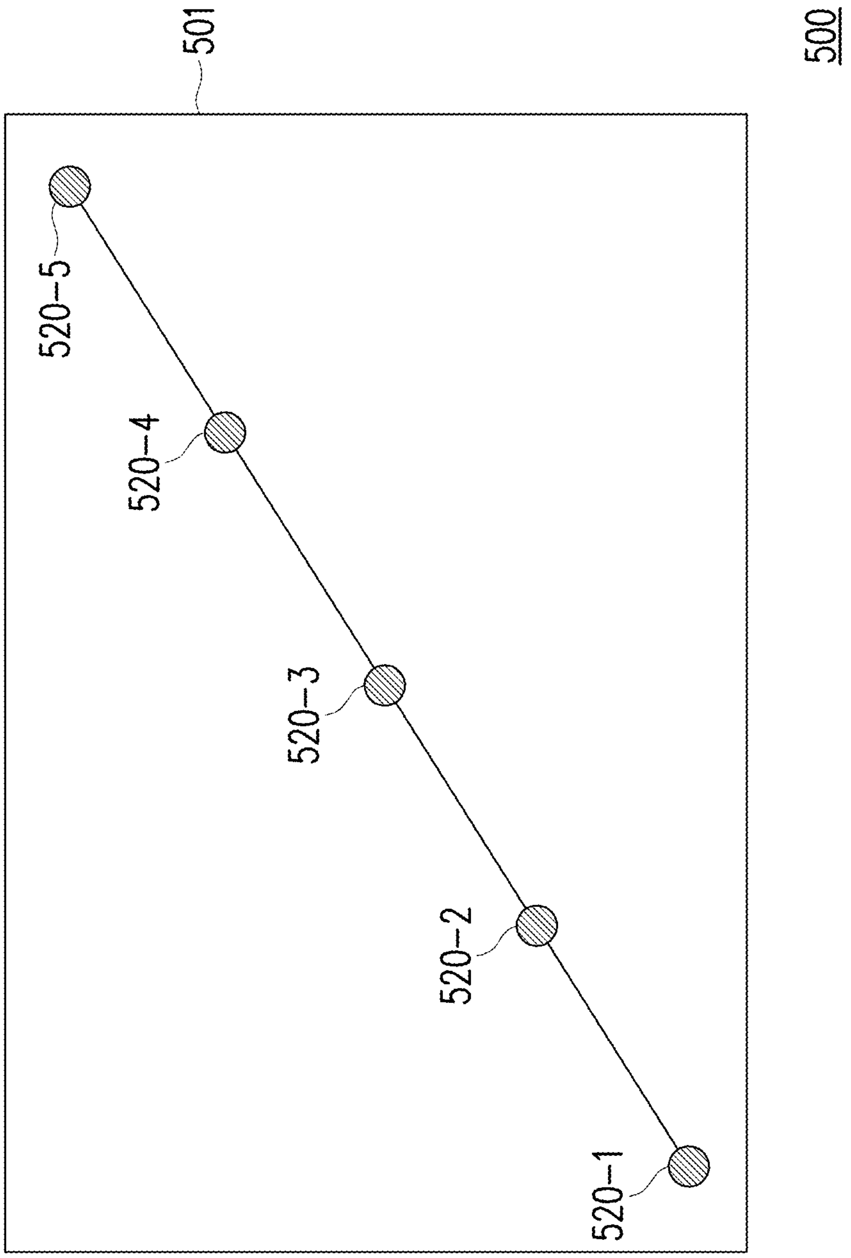
FIG. 5 is a block diagram of a display device according to another embodiment of the present disclosure.

FIG. 5 illustrates a block diagram of a display device according to another embodiment of the present disclosure. Referring to FIG. 5, the display device 500 includes a substrate 501, a controlling circuit (not shown), multiple sensing circuits 520-1 to 520-5, and multiple pixel units (not shown). The substrate 501, controlling circuit, multiple sensing circuits 520-1 to 520-5, and multiple pixel units may be understood by reference to and extrapolation from the relevant descriptions of the display device 100 or the display device 300. The quantity of multiple sensing circuits 520-1 to 520-5 is provided solely for illustrative purposes.

Compared to the embodiment in FIG. 3, in the embodiment of FIG. 5, there are multiple sensing circuits 520-1 to 520-5. The sensing circuits 520-1 to 520-5 are dispersedly arranged in the active area (not shown) of the substrate 501. Specifically, multiple thermistors within the sensing circuits 520-1 to 520-5 (including thermistor 321 as shown in FIG. 3) are respectively disposed at different positions on the substrate 501. Furthermore, the thermistors are arranged starting from the center of the active area of the substrate 501 and are dispersedly disposed from the center towards the periphery of the active area. For instance, multiple thermistors are respectively disposed at various positions along the diagonal lines of the substrate 501. Alternatively, with the intersection of the two diagonal lines of the substrate 501 as the center, multiple thermistors are positioned at various positions on the substrate 501, each having a different radial distance from this center.

It should be noted that, in response to various temperature variations at different positions on the display device 500, the resistance values of multiple thermistors in the sensing circuits 520-1 to 520-5 correspondingly change. Consequently, the sensing circuits 520-1 to 520-5 respectively generate multiple sensing voltages (including the sensing voltage Vout as shown in FIG. 3) based on the input voltage (for example, the input voltage Vin as illustrated in FIG. 3).

Continuing from the aforementioned explanation, the controlling circuit, based on multiple reference tables (for example, the first reference table and the second reference table as described in the embodiments of FIG. 3 and FIG. 4), generates multiple offset voltages corresponding to different positions according to multiple sensing voltages (including the offset voltage Vbs as shown in FIG. 3). The controlling circuit drives multiple driving transistors corresponding to different positions based on the offset voltages.

In more specific terms, the controlling circuit, based on a first reference table, obtains multiple sensed temperatures according to multiple sensing voltages output by multiple sensing circuits 520-1 to 520-5. The sensed temperatures respectively indicate various current temperature variations at different positions (or, in different areas) of the display device 500.

Subsequently, the controlling circuit calculates, based on the second reference table, each sensed temperature to obtain a corresponding offset voltage difference. The multiple offset voltage differences respectively indicate various variations in the threshold voltages of multiple driving transistors, wherein the driving transistors are respectively located at corresponding multiple positions (or, in multiple areas). The controlling circuit generates multiple offset voltages respectively based on the offset voltage differences, and outputs the offset voltages to the multiple driving transistors located at the corresponding various positions (or, in various corresponding areas).

In other words, taking into consideration the temperature variations at different positions (or within different areas), through the separate configuration of multiple sensing circuits 520-1 to 520-5 at multiple positions, the display device 500 is capable of compensating for the variations generated by multiple driving transistors situated at different positions, corresponding to various temperatures.

Based on the foregoing, the display device in the embodiments of the present disclosure, utilizing multiple reference tables and a thermistor disposed on the substrate, is capable of ascertaining the resistance, temperature, and the threshold voltage of the driving transistor corresponding to the sensing voltage. The controlling circuit may further compensate for variations in the driving transistor caused by temperature based on the aforementioned multiple parameters (including the threshold voltage corresponding to temperature changes). Consequently, the display device may adapt to its current temperature to drive multiple pixel units with a compensated offset voltage, thereby preventing abnormalities of the display screen of the display device. In certain embodiments, through the placement of multiple thermistors at various positions, the display device is capable of compensating for variations in the corresponding driving transistors in response to temperature fluctuations in different positions or areas.

Although the present disclosure has been disclosed by way of exemplary embodiments as described above, it is not to be construed as limiting the disclosure. Any person of ordinary skill in the relevant art may make various modifications and refinements without departing from the spirit and scope of the disclosure. Therefore, the scope to be protected by the present disclosure shall be determined by the appended claims.

What is claimed is:

1. A display device, comprising:

a plurality of driving transistors, disposed on a substrate, and configured to drive a plurality of light-emitting elements;

at least one sensing circuit, comprising a thermistor, disposed on the substrate, and configured to generate a sensing voltage based on an input voltage; and a controlling circuit, coupled to the plurality of driving transistors and the at least one sensing circuit, and configured to generate an offset voltage according to the sensing voltage, based on a plurality of reference tables associated with a resistance, a temperature, and a threshold voltage of each of the driving transistors, and to drive the plurality of driving transistors based on the offset voltage, wherein the controlling circuit is configured to:

look up a first reference table among the plurality of reference tables to obtain a sensed temperature according to a sensing resistance value of the thermistor;

calculate the sensed temperature to obtain an offset voltage difference for the individual threshold voltage based on a second reference table among the plurality of reference tables, comprising:

perform interpolation calculations on the sensed temperature according to the second reference table to obtain the threshold voltage corresponding to the sensed temperature; and calculate a difference between the obtained threshold voltage and a preset threshold voltage to obtain the offset voltage difference, wherein the preset threshold voltage comprises the threshold voltage indicated in a specification of the driving transistors and a current threshold voltage of the driving transistors prior to the temperature changed; and generate the offset voltage according to the offset voltage difference, wherein the controlling circuit is coupled to a first terminal of the thermistor through a first pin to provide the input voltage, and is coupled to a second terminal of the thermistor and a second resistor of the at least one sensing circuit at a voltage divider node to receive the sensing voltage, the controlling circuit is further configured to calculate the sensing voltage to obtain the sensing resistance value of the thermistor based on the input voltage and voltage division information at the voltage divider node.

2. The display device according to claim 1, wherein the first reference table comprises a corresponding relationship between a resistance value of the thermistor and a temperature, and the second reference table comprises a corresponding relationship between the temperature and the individual threshold voltage.

3. The display device according to claim 1, wherein the first terminal of the thermistor receives the input voltage, the second terminal of the thermistor is coupled with a first terminal of the second resistor to output the sensing voltage, and a second terminal of the second resistor receives a reference voltage.

4. The display device according to claim 3, wherein a material of the second resistor comprises a polysilicon material.

5. The display device according to claim 1, wherein the thermistor is disposed on the substrate by means of bonding.

6. The display device according to claim 1, wherein the at least one sensing circuit is plural, and the thermistors in the sensing circuits are respectively disposed at different positions of the substrate.

7. The display device according to claim 6, wherein the sensing circuits respectively generate a plurality of sensing voltages according to the input voltage, so that the controlling circuit generates a plurality of offset voltages corresponding to different positions according to the plurality of sensing voltages based on the plurality of reference tables, and to drive the plurality of corresponding driving transistors according to the plurality of offset voltages.

* * * * *